US006415524B1

United States Patent
Müller et al.

(10) Patent No.: US 6,415,524 B1
(45) Date of Patent: Jul. 9, 2002

(54) MEASURING EQUIPMENT WITH A SAFETY APPARATUS FOR THE TRANSPORT AND THE ASSEMBLY OF THE MEASURING EQUIPMENT

(75) Inventors: Josef Müller, Burghausen; Wilhelm Schröder, Traunstein, both of (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 09/548,478

(22) Filed: Apr. 13, 2000

(30) Foreign Application Priority Data

Apr. 16, 1999 (DE) ........................................ 199 18 654

(51) Int. Cl.⁷ ............................................. G01B 11/00
(52) U.S. Cl. ..................................................... 33/706
(58) Field of Search ......................... 33/706, 707, 708, 33/710

(56) References Cited

U.S. PATENT DOCUMENTS

| | | | |
|---|---|---|---|
| 4,070,759 A | | 1/1978 | Nelle |
| 4,136,958 A | | 1/1979 | Nelle |
| 4,160,328 A | | 7/1979 | Ernst |
| 4,165,564 A | | 8/1979 | Burkhardt |
| 4,170,826 A | | 10/1979 | Holstein |
| 4,170,829 A | | 10/1979 | Nelle |
| 4,198,757 A | | 4/1980 | Nelle et al. |
| 4,276,696 A | | 7/1981 | Ernst |
| 4,320,578 A | | 3/1982 | Ernst |
| 4,400,880 A | | 8/1983 | Nelle |
| 4,444,504 A | * | 4/1984 | Takizawa ..................... 33/706 |
| 4,479,304 A | | 10/1984 | Nelle |
| 4,492,032 A | | 1/1985 | Nelle |
| 4,509,262 A | | 4/1985 | Nelle |
| 4,530,157 A | | 7/1985 | Nelle |
| 4,534,113 A | | 8/1985 | Holstein |

(List continued on next page.)

FOREIGN PATENT DOCUMENTS

| | | |
|---|---|---|
| DE | 30 20 003 | 12/1981 |
| DE | 35 27 652 | 2/1986 |
| DE | 39 17 717 | 2/1992 |
| EP | 0 323 550 | 7/1994 |

OTHER PUBLICATIONS

Pending Patent Application Assigned to Dr. Johannes Heidenhain GmbH—Patent Application Serial No.: 09/131,050, Inventor: Tondorf, Filing Date: Aug. 07, 1998.
Pending Patent Application Assigned to Dr. Johannes Heidenhain GmbH—Patent Application Seial No.: 09/178, 214, Inventor: Tondorf et al. Filing Date: Oct. 23, 1998.
Pending Patent Application Assigned to Dr. Johannes Heidenhain GmbH—Patent Application Serial No.: 09/299, 216, Inventor: Kovac, Filing Date: Apr. 22, 1999.
Pending Patent Application Assigned to Dr. Johannes Heidenhain GmbH—Patent Application Serial No.: 09/537, 625, Inventor: Nelle, Filing Date: Mar. 29, 2000.

*Primary Examiner*—Christopher W. Fulton
(74) *Attorney, Agent, or Firm*—Brinks Hofer Gilson & Lione

(57) ABSTRACT

A measuring system for determining the position of two machine components that are movable in relation to each other, having a measuring graduation extending in a measuring direction, a support body supporting the measuring graduation, a scanning device scanning the measuring graduation, a mounting base for fastening the scanning device on one of the components, and a securing device for fixing the mounting bas in place in a prescribed position with respect to the support body. The securing device includes a base body that is supported on at least two areas of the support body that are spaced apart from each other with respect to the measuring direction and a guide element. A guide track is provided in the support body, wherein the guide element interlockingly engages the guide element and in which the guide element can be clamped in place in that the guide element is displaced in relation to the base body by a connecting element.

23 Claims, 3 Drawing Sheets

U.S. PATENT DOCUMENTS

| | | |
|---|---|---|
| 4,549,354 A | 10/1985 | Affa et al. |
| 4,554,741 A | 11/1985 | Affa |
| 4,559,707 A | 12/1985 | Oberhans |
| 4,570,346 A | 2/1986 | Burkhardt |
| 4,593,471 A | 6/1986 | Nelle |
| 4,663,853 A | 5/1987 | Indo et al. |
| 4,776,098 A | 10/1988 | Nelle |
| 5,016,359 A | 5/1991 | Nagaoka et al. |
| 5,485,680 A * | 1/1996 | Nelle .......................... 33/706 |
| 5,611,148 A | 3/1997 | Affa |
| 5,655,311 A | 8/1997 | Affa |

* cited by examiner

MEASURING EQUIPMENT WITH A SAFETY APPARATUS FOR THE TRANSPORT AND THE ASSEMBLY OF THE MEASURING EQUIPMENT

Applicants claim, under 35 U.S.C. § 119, the benefit of priority of the filing date of Apr. 16, 1999 of a German patent application, copy attached, Ser. No. 199, 18 654,5, filed on the aforementioned date, the entire contents of which is incorporated herein by reference.

BACKGROUND OF THE INVENTION

1. Field of the Invention

The invention relates to a measuring system for determining the position of two machine components that are movable in relation to each other, having a securing device for transport and mounting.

2. Discussion of Related Art

A measuring system of the type mentioned at the outset and having a securing device is known from DE 30 20 003 C2. Here, a measuring system includes a longitudinally extending measuring graduation, a support body supporting the measuring graduation, a scanning device scanning the measuring graduation, which is guided at a defined distance from the measuring graduation, and a mounting base connected with the scanning device for fastening the scanning device on one of the components which are movable with respect to each other. The two components, which are movable with respect to each other, can be the carriage and the associated base of a machine tool in particular. In this case, the support body with the measuring graduation on the one hand, and the mounting base with the scanning device on the other, are respectively fastened on one of these components. The securing device itself has two base bodies, which can be displaced along a guide slit in the support body. A resilient tongue is arranged on each base body, by means of which the securing device can be clamped to the support body in order to maintain the mounting base on the support body in a defined prescribed position during the transport and mounting of the measuring system The known securing device has the disadvantage that it merely permits a fixing in place, which involves play, of the mounting base, and therefore also of the scanning device, on the support body since, in order to be able to remove the securing device again from the support body at the termination of mounting the measuring system on a machine tool, the resilient tongue of the securing device must be designed to be sufficiently elastic.

A mechanism for fastening a measuring system containing a magnetic scale on a machine tool is known from DE 35 27 652 A1, which includes a securing device, by means of which the support bodies of the magnetic scale and the associated scanning device are aligned with each other during mounting. This securing device has the disadvantage that it is only insufficiently guided on the support body.

A measuring system for monitoring relative displacements is known from DE 39 17 717 C2, which is intended to determine the displacement of machine elements of a machine tool that can be moved in relation to each other. A locking device is employed during mounting of this measuring system on the machine tool, by means of which the scanning device of the measuring system can be maintained in a position in which it does not. interfere with the mounting operation. This locking device includes a plastically or elastically deformable material, so that it can be clipped to the support body. Because of its deformability, this locking device is therefore not suited to fix the position of the support body on the one hand, and of the scanning device on the other hand, in a manner which is free of play to a great extent.

The measuring system in accordance with EP 0 323 550 B1 has a securing device which is clamped in the support body by tilting. For clamping, the securing device is supported on the one hand on the support body and, on the other hand, has an element that is rigidly fastened on it and engages a groove of the support body. Because of this engagement it is difficult to remove the securing device from the measuring system.

OBJECTS AND SUMMARY OF THE INVENTION

It an object of the present invention to create a measuring system for determining the position of two components which are movable in relation to each other, having a securing device for the transport and mounting of the measuring system, wherein the support body as well as the scanning device of the measuring system can be fixed in place essentially without play in a defined relative position, and wherein the securing device can be removed in the easiest possible manner at the termination of mounting of the measuring system.

The securing device is used for fixing the scanning device of the measuring system in a defined position (prescribed position) on the support body of the measuring system during the transport and mounting of the latter.

The securing device in accordance with the present invention has the advantage of making possible a very stable, essentially rigid fixation in place of the mounting base of the scanning device on the support body, in that the guide element of the securing device is fastened with clamping forces of an appropriate strength on the support body. The securing device can also be simply removed from the support body at the termination of mounting, in that the connection between the base body and the guide element of the securing device is released. The base body can then be simply removed. The guide element either remains in the associated guide track of the support body, or is removed from it. In the latter case the guide element must be designed in such a way that its interlocking connection with the guide track of the guide body can be released after the base body has been removed.

Accordingly, the present invention is able to position a scanning device at a defined position of the support body of a measuring graduation, in that the mounting base of the scanning device is slid, together with the securing device, along a guide track of the support body into a predetermined position. There, the mounting base, and therefore also the scanning device, are then fixed in place by providing a clamped connection between the securing device and the support body. In this case, the guide element of the securing device is preferably rigidly embodied in such a way that it can be clamped in place, free of play, on the support body by clamping forces acting transversely to the measuring direction.

Because of the possibility of being able to hold the mounting base free of play in a defined position on the support body by the securing device in accordance with the present invention, during mounting of the measuring system it is now possible, because of the preset position of the mounting base on the support body, to align the two components of the machine tool which are movable in relation to each other. These two components need not necessarily be machine parts, such as the base and the carriage of a machine tool; instead it is also conceivable that additional added-on elements, which support the measuring system and which are aligned with each other in the course of mounting the measuring system, are provided on these machine parts. In this case, the base and the carriage of the machine tool can already be aligned with each other prior to mounting the measuring system.

The connector elements, through which the base body and the guide element of the securing device are connected with each other, are preferably used for generating the required clamping forces. This can be a screw connection, for example.

The guide track of the support body can be a guide groove with an undercut, so that the guide element can be arranged interlocked and longitudinally displaceable in the guide groove.

In a preferred embodiment of the present invention, the securing device is constituted by two separate base bodies, which are arranged, spaced apart in the measuring direction, on respectively one of the front faces of the mounting base. It is possible here to assign each of the two base bodies its own guide element; on the other hand, however, the two base bodies can also be rigidly connected with each other via a common guide element. In the first case, a rigid arrangement of the two base bodies with respect to each other can be achieved by an additional bracket connecting the two base bodies with each other. In the second mentioned case, a dependable support of the mounting base on both sides in its prescribed position is made possible with only three components. Here, the guide element additionally takes on the function of the securing bracket.

An arrangement of the securing device on the support body, which is essentially free of play, can in particular be achieved if not only its guide element is clamped in place on a protrusion of the support body extending along the guide track, but in that the base body of the securing device is additionally supported on the support body outside of the guide track. In this case, the base body can operate in a longitudinally displaceable way together with the support body, for example, by a groove and tongue connection.

In a preferred embodiment of the present invention, an aligning device is provided for aligning the mounting base in relation to the support body. For example, the aligning device can include a tongue arranged on the security device so that the distance between the mounting base and the support body transversely in respect to the measuring device is fixed.

Moreover, the aligning device can include connecting elements, which provide an interlocking connection between the securing device and the mounting base. For example, this can be a connection, wherein a peg of the mounting base or of the securing device, respectively, projects into a recess of the other component which is assigned to it, wherein the peg and/or the recess preferably have bevels or chamfers for compensating manufacturing tolerances. But a force-locking or frictional connection between the securing device and the mounting base is also possible.

Furthermore, in order to be able to compensate for tolerances that must be taken into consideration when fastening the measuring system on a machine tool, the play of the interlocking connection between the securing device and the mounting base can preferably be varied. For this purpose, it is possible to provide a number of different connecting elements on the securing device and/or the mounting base, respectively, one part of which is selected for making the interlocking connection. For example, different connecting elements can be respectively arranged on both front faces of the base body of the securing device, so that the play in the connection between the securing device and the mounting base can be varied in that the base body of the securing device is fastened either by the one or the other front face on the mounting base.

Different connection elements in particular can be employed for varying the play of the connection between the securing device and the mounting base that, although their exterior shape agrees, differ in size.

The play between the securing device and the mounting can also be varied, in particular when using pegs provided with bevels or chamfers for connecting the securing device and the mounting base, in that the distance between the base body of the securing device and the mounting base can be varied. This can take place, for example, in that the base body and guide element of the securing device can be connected in different positions in relation to each other.

Further advantages of the invention will become apparent in the course of the following description of an exemplary embodiment, making reference to the drawings.

DETAILED DESCRIPTION OF PREFERRED EMBODIMENTS OF THE INVENTION

Figure 1:
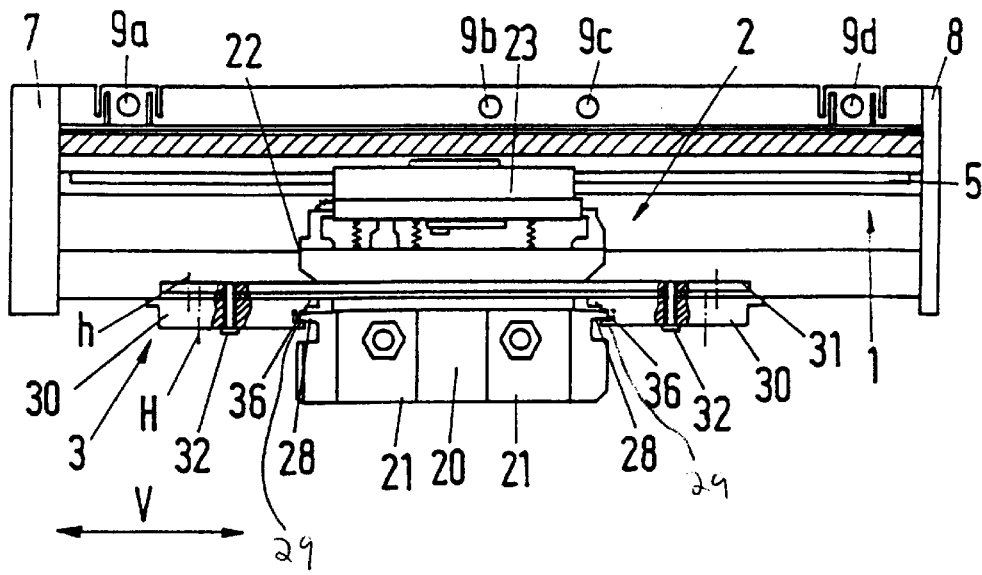
FIG. 1 is a lateral view of an embodiment of a measuring system with a securing device for maintaining a mounting base of the measuring system in a defined position.
Figure 2:
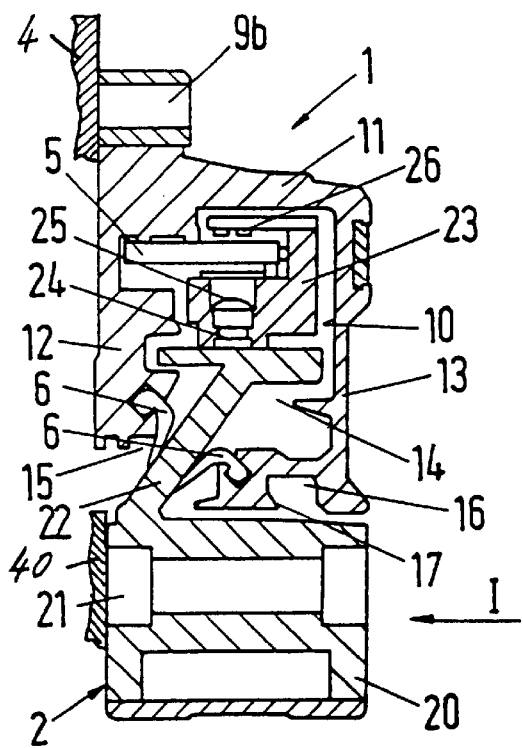
FIG. 2 is a cross section through the measuring system in accordance with FIG. 1 in the area of the mounting base.
Figure 3:
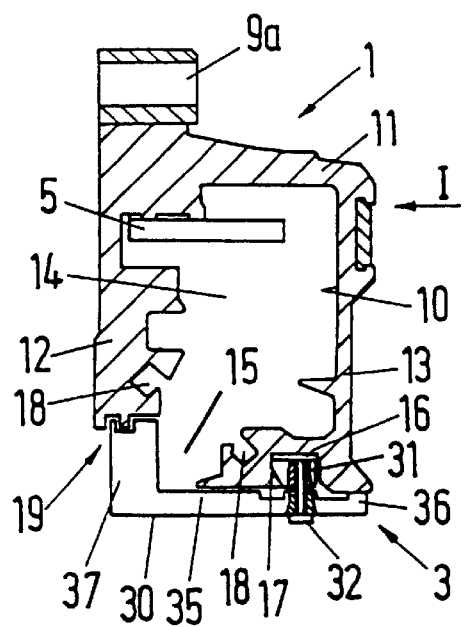
FIG. 3 is a cross section through the measuring system in accordance with FIG. 1 in the area of a securing device.

A measuring system for determining the position of two components 4, 40 of a machine tool, which are movable in relation to each other, is represented in FIGS. 1–3, and includes a support body 1, a scanning device 2 and a securing device 3, by which the scanning device 2 can be maintained in a defined prescribed position on the support body 1. Here, the leg 13, which is in front in the viewing direction I (see FIGS. 2 and 3), is not represented in order to clear the view of the interior of the support body 1.

FIGS. 2 and 3 respectively represent a cross section through the measuring system in accordance with FIG. 1 in the area of a mounting opening 9b, or respectively a mounting opening 9a. For reasons of clarity, here only the components of the scanning device 2 are represented in FIG. 2, and the components of the securing device 3 in FIG. 3, besides the components of the support body 1.

In accordance with FIGS. 1 and 2, the support body 1 includes a longitudinally extending hollow profile 10 with a base 11, from which two lateral legs 12, 13 project essentially vertically. This hollow profile 10 encloses an interior hollow space 14, in which a longitudinally extending measuring graduation 5 is arranged, and which is accessible from the outside through a slit 15, closed by elastic sealing lips 6. On both of its ends, the hollow profile 10 is provided with lateral closing elements 7, 8, and on its top it has a mounting strip with openings 9a to 9d for fastening the support body 1 on a machine component 4, for example the carriage of a machine tool.

The scanning carriage 23 with a scanning device 2 is arranged, longitudinally displaceable, inside the hollow profile 10 and has a light source 24, a lens system 25 and photo elements 26 for scanning the optical measuring graduation 5. Via an engagement piece 22, the scanning carriage is connected resiliently, but rigidly in the measuring direction V, with a mounting base 20 arranged outside of the hollow chamber 14. The mounting base 20 is used for fastening the scanning device 2 on a second machine component 40 such as, for example, the base of the above mentioned machine tool. The mounting base 20 has through-openings 21 for this purpose.

A measuring system of the above-described type is generally known and it is therefore not necessary to describe its function in greater detail here.

It can be seen from FIGS. 1 and 3 that the measuring system furthermore has a securing device 3, which fixes the mounting base 20 in place on the support body 1. This securing device 3 has two base bodies 30, which are arranged on the two front faces of the mounting base 20 that are spaced apart from each other in the measuring direction V. Each of the base bodies has an aligning device that includes tongues 28 and recesses 29, wherein the recesses 29 are engaged by corresponding tongues 28 of the mounting base 20. The measuring direction V corresponds to the displacement direction of the mounting base 20 in relation to the support body during position measuring.

The two base bodies 30 of the securing device 3 are connected with each other via a guide element 31, whose two lateral end sections are fastened by a connecting element 32 in the form of a screw on the respective base body 30. In this case the screws 32 extend through a passage in the base bodies 30 and have been screwed into an associated thread of the guide element 31.

It is moreover made clear by FIG. 3 that the guide element 31 of the securing device 3 is guided on a guide track 16 of the hollow profile 10, which track is designed as a dovetailed groove and has a protrusion 17 forming an undercut. The guide element 31 is maintained interlockingly in the dovetailed groove 16 by this undercut. In place of a dovetailed groove, a T-groove or an L-groove, for example, are also suited for the interlocking reception of a guide element.

Each of the base bodies 30 of the securing device 3 includes tongues 36 on both sides, by which the distance of the mounting base 20 from the support body 1 can be fixed transversely in respect to the measuring direction V. Furthermore, a leg 37 extends vertically from the base 35 of each base body 30 and is supported on an oppositely located leg 12 of the support body 1 via a groove and tongue guide 19.

Accordingly, the base bodies 30 of the securing device 3 are arranged in a longitudinally displaceable manner on the one hand by the guide element 31 arranged in the dovetailed groove 16, and on the other hand by the groove and tongue guide 19. In place of a common guide element 31, by which the two base bodies 30 are rigidly connected with each other, it is also possible to provide each base body 30 with its own guide element. In that case, it is advantageous to additionally connect the two base bodies 30 of the securing device 3 by lateral brackets.

The receptacles 18 for the sealing lips 6 of the support body 1 are furthermore visible in FIG. 3, since here the sealing lips have not been represented for reasons of clarity.

When the two base bodies 30 of the securing device 3 are only comparatively loosely connected with the associated guide element 31 via the screws 32, it is possible to displace the securing device 3 together with the scanning device 2 on the support body 1 in the direction V. Once the scanning device has reached a defined, predeterminable prescribed position on the support body 1, it can be fixed in place in this prescribed position by snugly tightening the screws 32, which are used for connecting the base bodies 30 and the guide element 31. Due to this, the guide element 31 is frictionally, or respectively interlockingly, clamped in the dovetailed groove 16, wherein the clamping forces act transversely in respect to the measuring direction V. Because of the clamping forces caused by tightening the two screws 32, a beveled section of the guide element 31 comes into frictional contact with a corresponding section of the protrusion 17 of the hollow profile 10, which forms an undercut in the dovetailed groove 16. Thus, a very strong clamped connection between the securing device 3 and the support body 1 is created here.

Because of the additional lateral support of the base bodies 30 on a leg 12 of the support body 1 via respective lateral legs 37 and a tongue and groove guide 19, the connection between the securing device 3 and the support body 1 is further designed to be safe from tilting.

A positioning, essentially free of play, of the securing device 3, and therefore also of the scanning device 2, can be furthermore achieved here in that the guide element 31 can be made of a very solid material. Because the guide element 31 and the at least one base body 30 of the securing device 3 are designed as separate components, which are releasably connected with each other, it is not necessary to embody the guide element 31 elastically in such a way that it can be taken out of the dovetailed groove 16 for releasing the securing device 3 from the support body 1 together with the base body 30.

Instead, the securing device 3 is removed from the support body 1 in that initially the two screws 32 are loosened and the base bodies 30 are removed. In this case the guide element 31 can remain in the dovetailed groove 16. Alternatively it is possible to design the guide element 31 in such a way that after the base bodies 30 have been taken out it can be removed out of the dovetailed groove 16 by tilting it. However, such tilting is only possible after the base bodies 30 have been taken out, which are supported on one leg 12 of the support body 1 by the tongue and groove connection and therefore prevent tilting of the securing device 3.

As a whole, because of its multi-part design, the securing device 3 makes possible a rigid connection, free of play, with the support body 1, so that accordingly the scanning device 2, which is connected with the securing device 3, can also be held free of play in a defined prescribed position on the support body 1. It is possible by this to align the two machine components 4, 40, which are movable in respect to each other and are to be connected with the measuring system, because of the exactly adjusted relative positions of the support body 1 and the scanning device 2. After this has taken place and the support body 1, as well as the mounting base 20 of the scanning device 2, are respectively connected with one of the two machine components 4, 40, the securing device 3 is removed from the support body 1 in the manner described above.

Figure 5:
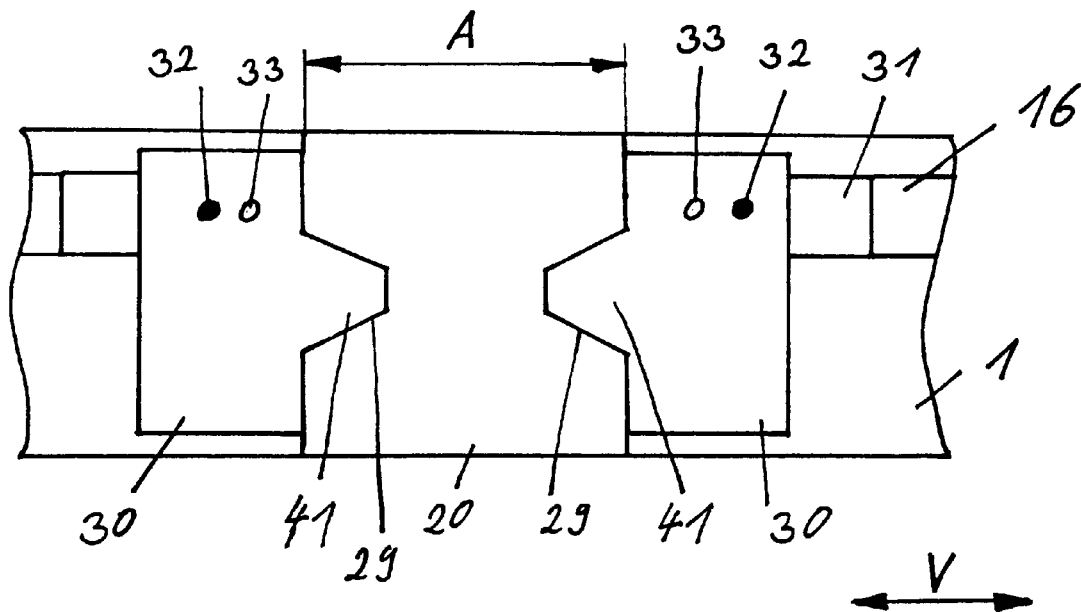
FIG. 5 shows the interlocking connection in accordance with FIG. 4 in principle in a first mounting position.
Figure 6:
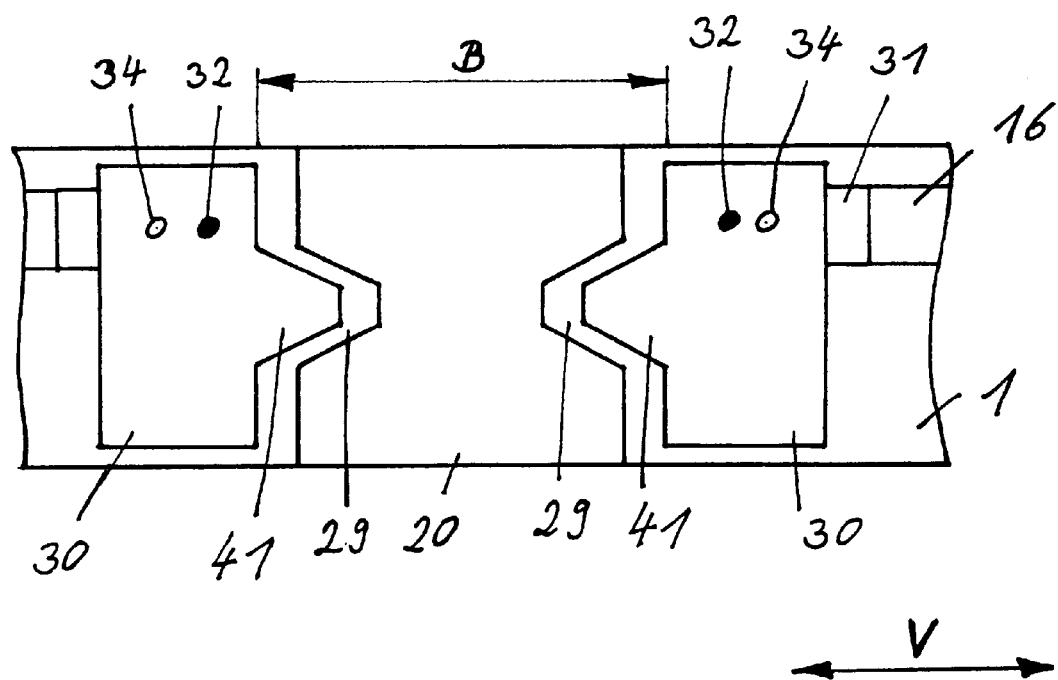
FIG. 6 shows the interlocking connection in accordance with FIG. 4 in a second mounting position.

If, for compensating mounting tolerances, or otherwise a certain play should be desired in the connection between the support body 1 and the scanning device 2, it is possible to provide a variable connection between the base bodies 30 and the guide element 31 of the securing device 3. For this purpose, respective additional passages for the screws 32 can be provided at the base bodies 30 at the position H, and respective additional inner threads for receiving the screws 32 at the position h. By this, the base bodies 30 can be fastened on the guide element 31 in respective second positions in such a way that the distance between the base bodies 30 and the respectively associated front face of the mounting base 20 is increased. If now the tongues 28 of the mounting base 20 are embodied to taper conically toward their ends, it is achieved that there is a certain amount of play between the securing device 3 and the mounting base 20, and therefore also between the entire scanning device 2 and the support body 1, which can be set, defined by the distance between the base bodies 30. In this case, the play determined by this distance preferably corresponds to the permissible mounting tolerance of the mounting base 2 in relation to the base body 1 on the machine components 4, 40. Details of this will be explained in what follows by means of FIGS. 4 to 6.

Figure 4:
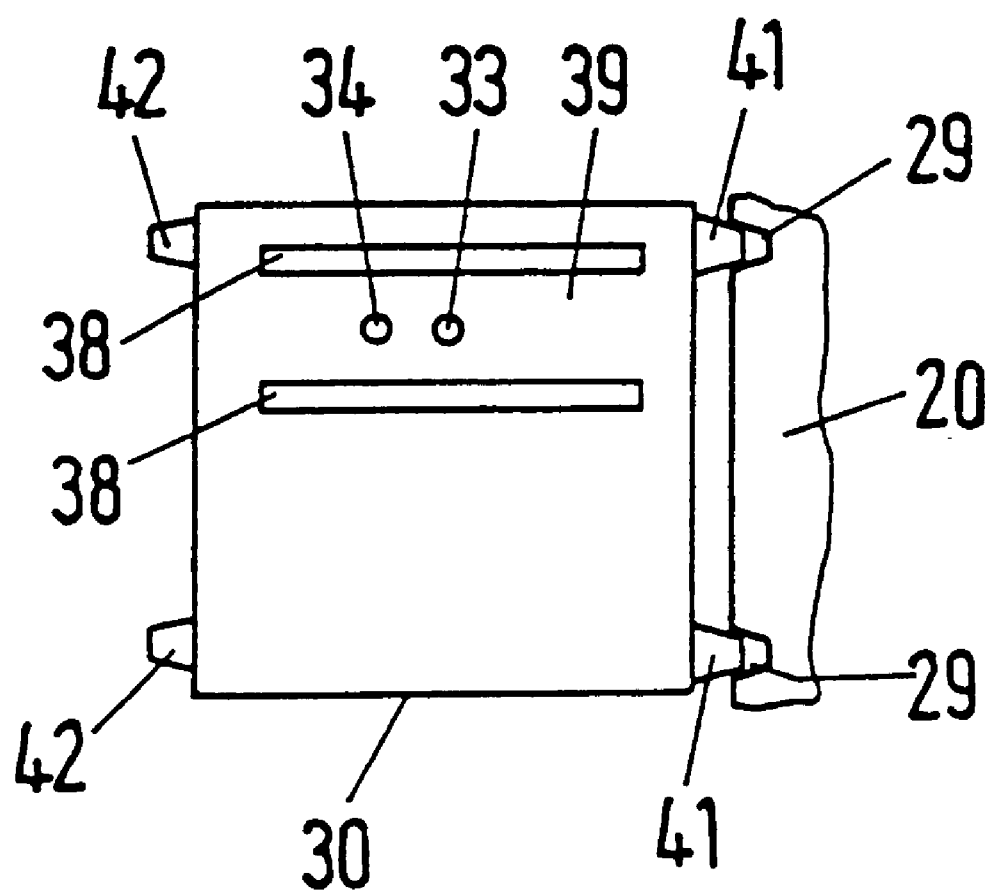
FIG. 4 represents an embodiment of a mechanism for the interlocking connection between the mounting base and the securing device.

A base body 30 for a securing device 3 corresponding to FIGS. 1 to 3 is schematically represented in a view from above in FIG. 4. The base body 30 includes a strip 39, which is laterally separated from the remainder of the base body 30 by two slits 38. A passage 33 is provided in this strip 39 for receiving one of the screws 32 (see FIGS. 1 to 3), by which the base body 30 can be connected with the guide element 31 of the securing device 3.

The strip 39, which is bordered by two lateral slits 38, here causes a certain elasticity of the base body 30 in the area of the passage 33. A second passage 34, offset in the measuring direction V, is indicated next to this passage 33 and permits a variable fastening of the base body 30 on the guide element 31 of the securing device; in this connection see the corresponding remarks regarding FIG. 1, in particular the positions H and h there. Because the passages 33, 34 are arranged on a strip 39, it is possible to achieve a certain amount of elasticity of the base body in the area of the passages 33, 34, in particular in case a rigid material is used for the base body 30.

In accordance with FIG. 4, the base body 30 has on its two front faces, which are spaced apart from each other in the measuring direction V, respectively another embodiment of an aligning device that includes two pegs 41, or respectively 42, and recesses 29, The pegs 41 and 42 are shaped in the form of truncated cones, i.e. are dynamically balanced, and taper conically toward their ends, to which correspondingly designed recesses 29 in the mounting base 20 are assigned.

An interlocking connection between the base body 30 of a securing device and the mounting base 20 of a scanning device can be provided by the pegs 41, or respectively 42, and the associated recesses 29, wherein the mounting base, for example in accordance with FIG. 1, can be held between two base bodies of the securing device arranged on its two front faces.

It can be seen in FIG. 4, in particular, that the play in the connection between the base body 30 and the mounting base 20 is a function of the position of the pegs 41 in the measuring direction V. The deeper the pegs 41 are pushed into the associated recesses 29, the less the play in the connection. The variation of the distance between the base body 30 and the mounting base 20 can be achieved here by using different passages 33, or respectively 34, in the base body 30 in the course of its connection with the guide element 31. The principle has been represented in a simplified way in FIGS. 5 and 6 by a conical peg 41 and a recess 29. In accordance with FIG. 5, the base bodies 30 with the common guide element 31 are fixed in place at a distance A from each other, in which the mounting base 20 is rigidly fastened in relation to the base bodies 30. As a rule, this position is selected while the position measuring system is being transported, wherein the base bodies 30 and the guide element 31 are clamped on the support body 1 by the screws 32. However, it is also selected for mounting when, for example, the mounting holes in the machine components are only drilled later through the passages 21 and 9. The screws 32 are slightly loosened for mounting, so that the clamping on the support body 1 is released and the mounting base 20, together with the base bodies 30 and the guide element 31, can be displaced in the measuring direction V on the support body 1 into the mounting position, however, the mounting base 20 is still maintained here without play on the securing device 3 by the base bodies 30. In accordance with FIG. 6, the base bodies 30 with the guide element 31 are fixed in place at a distance B from each other by the screws 32, in which the mounting base 20 can be displaced in any direction in relation to the base bodies 30, and therefore to the support body in an area which is less than or equal to the permissible mounting tolerance of the mounting base 20 in relation to the support body 1 on the machine components 4, 40.

Another option of varying the play in the connection between the mounting base 20 and the base body 30 lies in the use of pegs of different size. To this end, in accordance with FIG. 4 further pegs 42 are provided on the left front face of the base body 30, whose exterior shape agrees with the first pegs 41, but whose outer dimensions is less. Thus, the play can be increased here in that the base body 30 is connected with the mounting base 20 via the second pegs 42, instead of via the first peg 41. For this purpose the base bodies are simply used turned around.

Altogether it is possible by varying the size of the connecting elements acting together on the mounting base 20, on the one hand, and the base body 30 of the securing device on the other hand, to provide an interlocking connection with a defined amount of play between these two components.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

We claim:

1. A measuring system for determining the position of two machine components, which are movable in relation to each other, comprising:
    a measuring graduation extending in a measuring direction;
    a support body supporting the measuring graduation;
    a scanning device scanning the measuring graduation;
    a mounting base for fastening the scanning device on one of the machine components;
    a securing device for fixing the mounting base in place in a prescribed position with respect to the support body, wherein the securing device comprises:
        a base body that is supported on at least two areas of the support body which are spaced apart from each other transversely in respect to the measuring direction;
        a guide element; and
        a guide track provided in the support body, wherein the guide element interlockingly engages the guide track and in which the guide element can be clamped in place in that the guide element is displaced in relation to the base body by a connecting element.

2. The measuring system in accordance with claim 1, wherein the guide track is provided between the at least two support areas on the support body.

3. The measuring system in accordance with claim 1, wherein the support body has a hollow profile with a hollow space, which has a slit that is bordered by two legs, extends in the measuring direction and is covered by sealing elements, wherein the base body of the securing device is supported on both of the two legs, and the guide track is provided in one of the two legs outside of the hollow space.

4. The measuring system in accordance with claim 1, wherein the guide element is rigid and is clamped in place on a protrusion of the support body which extends over the guide element in the guide track.

5. The measuring system in accordance with claim 1, wherein the guide track is a guide groove formed in the support body and the guide track has an undercut extending over the guide element and is provided for receiving clamping forces acting transversely in regard to the measuring direction.

6. The measuring system in accordance with claim 1, wherein the base body and the guide element of the securing device are fastened on each other via connecting elements by which the clamping force of the guide element acting on the support body are adjusted.

7. The measuring system in accordance with claim 1, wherein the securing device comprises a first base body and a second base body that are spaced apart from one another in the measuring direction.

8. The measuring system in accordance with claim 7, wherein each of the first and second base bodies comprises its own guide element.

9. The measuring system in accordance with claim 7, wherein a common guide element connects the first and second base bodies with each other.

10. The measuring system in accordance with claim 1, wherein the base body of the securing device is supported by a tongue and groove connection on the support body outside of the guide track.

11. The measuring system in accordance with claim 1, further comprising an aligning device on the securing device that aligns the mounting base with respect to the support body.

12. The measuring system in accordance with claim 11, wherein the aligning device comprise a tongue provided on the securing device for fixing the distance between the mounting base and the support body.

13. The measuring system in accordance with claim 11, wherein the aligning device comprises connecting elements that form an interlocking connection between the securing device and the mounting base.

14. The measuring system in accordance with claim 13, wherein the aligning device comprise a peg projecting into an associated recess.

15. The measuring system in accordance with claim 14, wherein at least one of the peg and associated recess comprises a bevel or chamfer.

16. A measuring system for determining the position of two machine components, which are movable in relation to each other, comprising:
a measuring graduation extending in a measuring direction;
a support body supporting the measuring graduation;
a scanning device scanning the measuring graduation;
a mounting base for fastening the scanning device on one of the machine components;
a securing device for fixing the mounting base in place in a prescribed position with respect to the support body, wherein the securing device comprises:
a base body that is supported on at least two areas of the support body which are spaced apart from each other transversely in respect to the measuring direction;
a guide element;
a guide track provided in the support body, wherein the guide element interlockingly engages the guide track and in which the guide element can be clamped in place in that the guide element is displaced in relation to the base body by a connecting element;
a first connecting element provided on the securing device; and
a second connecting element provided on the securing device, wherein the first and second connecting elements are selectively used for making the interlocking connection that varies the amount of play between the securing device and the mounting base.

17. A measuring system for determining the position of two machine components, which are movable in relation to each other, comprising:
a measuring graduation extending in a measuring direction;
a support body supporting the measuring graduation;
a scanning device scanning the measuring graduation;
a mounting base for fastening the scanning device on one of the machine components;
a securing device for fixing the mounting base in place in a prescribed position with respect to the support body, wherein the securing device comprises:
a base body that is supported on at least two areas of the support body which are spaced apart from each other transversely in respect to the measuring direction;
a guide element; and
a guide track provided in the support body, wherein the guide element interlockingly engages the guide track and in which the guide element can be clamped in place in that the guide element is displaced in relation to the base body by a connecting element;
an aligning device on the securing device that aligns the mounting base with respect to the support, wherein the aligning device comprises a peg projecting into an associated recess that form an interlocking connection between the securing device and the mounting base;
wherein the base body and the guide element can be connected in relation to each other in different positions for varying the amount of play between the securing device and the mounting base.

18. A measuring system for determining the position of two machine components, which are movable in relation to each other, comprising:
a measuring graduation extending in a measuring direction;
a support body supporting the measuring graduation;
a scanning device scanning the measuring graduation;
a mounting base for fastening the scanning device on one of the machine components;
a securing device for fixing the mounting base in place in a prescribed position with respect to the support body, wherein the securing device comprises:

a base body that is supported on at least two areas of the support body which are spaced apart from each other transversely in respect to the measuring direction;

a guide element; and a guide track provided in the support body, wherein the guide element interlockingly engages the guide track and in which the guide element can be clamped in place in that the guide element is displaced in relation to the base body by a connecting element;

an aligning device on the securing device that aligns the mounting base with respect to the support body, wherein the aligning device comprises a peg projecting into an associated recess that form an interlocking connection between the securing device and the mounting base;

wherein the base body and the guide element can be connected in relation to each other in different positions for varying the amount of play between the securing device and the mounting base and wherein at least one of the peg and associated recess comprises a bevel or chamfer.

19. A measuring system for determining the position of two machine components, which are movable in relation to each other, comprising:

a measuring graduation extending in a measuring direction;

a support body supporting the measuring graduation;

a scanning device scanning the measuring graduation;

a mounting base for fastening the scanning device on one of the machine components;

a securing device for fixing the mounting base in place in a prescribed position in respect to the support body, wherein the securing device comprises:

a first base body;

a second base body, wherein the first and second base bodies are arranged on front faces of the mounting base spaced apart from each other in the measuring direction, and the first and second base bodies supported on the support body;

a guide element common to the first and second base bodies; and a guide track provided in the support body, wherein the guide element interlockingly engages the guide track and on which the first and second base bodies are fastened; and, wherein the guide track and the first base body are clamped on the support body by the first base body.

20. A measuring system for determining the position of two machine components, which are movable in relation to each other, comprising:

a measuring graduation extending in a measuring direction;

a support body supporting the measuring graduation;

a scanning device scanning the measuring graduation;

a mounting base for fastening the scanning device on one of the machine components;

a securing device for fixing the mounting base in place in a prescribed position with respect to the support body;

a connecting element for producing an interlocking connection between the securing device and the mounting base so that the securing device can be fixed in relation to the mounting base in a position, and in which the mounting base is movably fixed on the support body, wherein the movement of the mounting base limited by the securing device is less than or equal to the permissible mounting tolerance of the mounting base in relation to the support body.

21. The measuring system in accordance with claim 20, wherein the securing device comprises a first base body and a second base body which are fixed in place on the mounting base and which can be spaced apart from each other in the measuring direction, at a first distance in which the mounting base is held free of play, and the first and second base bodies can be fixed in place in respect to each other at a second distance in which the mounting base is held with play by the first and second base bodies.

22. The measuring system in accordance with claim 21, wherein the first and second base bodies can be fixed in place at the first and second distances on a common connecting element.

23. The measuring system in accordance with claim 22, wherein the connecting element comprises a guide element that interlockingly engages a guide track of the support body and can be clamped therein.

\* \* \* \* \*